US011075931B1

(12) United States Patent
Warren et al.

(10) Patent No.: US 11,075,931 B1
(45) Date of Patent: Jul. 27, 2021

(54) SYSTEMS AND METHODS FOR DETECTING MALICIOUS NETWORK ACTIVITY

(71) Applicant: Stealthbits Technologies LLC, Hawthorne, NJ (US)

(72) Inventors: Jeffrey Adam Warren, Ridgewood, NJ (US); Sean Bergman, Jersey City, NJ (US)

(73) Assignee: Stealthbits Technologies LLC, Hawthorne, NJ (US)

(*) Notice: Subject to any disclaimer, the term of this patent is extended or adjusted under 35 U.S.C. 154(b) by 266 days.

(21) Appl. No.: 16/237,221

(22) Filed: Dec. 31, 2018

(51) Int. Cl.
*H04L 29/06* (2006.01)
*G06F 9/54* (2006.01)

(52) U.S. Cl.
CPC .......... *H04L 63/1425* (2013.01); *G06F 9/547* (2013.01); *H04L 63/1416* (2013.01); *H04L 63/20* (2013.01)

(58) Field of Classification Search
CPC . H04L 63/1425; H04L 63/20; H04L 63/1416; G06F 9/547
USPC .......................................................... 726/23
See application file for complete search history.

(56) References Cited

U.S. PATENT DOCUMENTS 8,387,145 B2 * 2/2013 Xie ...................... H04L 63/101 726/24
9,578,042 B2 * 2/2017 Hu ...................... H04L 63/1425
9,659,185 B2 * 5/2017 Elovici ................. G06Q 50/01
2005/0257261 A1 * 11/2005 Shraim ................. H04L 51/12 726/22
2006/0168042 A1 * 7/2006 Boivie ................... H04L 51/12 709/206
2010/0257598 A1 * 10/2010 Demopoulos ....... H04L 63/1425 726/13
2011/0145922 A1 * 6/2011 Wood ................. H04L 63/1466 726/24
2011/0179487 A1 * 7/2011 Lee ..................... H04L 63/1491 726/23
2012/0042364 A1 * 2/2012 Hebert .................... G06F 21/46 726/6
2012/0150965 A1 * 6/2012 Wood .................... H04L 61/307 709/206
2012/0215861 A1 * 8/2012 Smith ................. G06Q 10/107 709/206
2013/0263226 A1 * 10/2013 Sudia ...................... G06F 21/60 726/4
2014/0359776 A1 * 12/2014 Liu ..................... H04L 63/1466 726/25

(Continued)

OTHER PUBLICATIONS

"New-HoneyHash.ps1", EmpireProject, retrieved from the Internet, https://github.com/EmpireProject/Empire/blob/master/data/module_source/management/New-HoneyHash.ps1 Aug. 5, 2015.

(Continued)

*Primary Examiner* — Badri Champakesan
(74) *Attorney, Agent, or Firm* — Austin Rapp

(57) ABSTRACT

Examples of devices and methods for detecting malicious network activity are described. Fake user credentials are saved into memory of a monitored device. The fake user credentials may include a username and a password hash for a nonexistent account. Reconnaissance on the fake user credentials is monitored. A compromised account is detected based on the fake user credential reconnaissance monitoring.

15 Claims, 5 Drawing Sheets

(56) References Cited

U.S. PATENT DOCUMENTS

| | | | | |
|---|---|---|---|---|
| 2017/0134423 | A1* | 5/2017 | Sysman | G06F 21/554 |
| 2018/0046796 | A1* | 2/2018 | Wright | G06F 21/45 |
| 2018/0167412 | A1* | 6/2018 | Barrett | H04L 63/1491 |
| 2018/0309787 | A1* | 10/2018 | Evron | G06F 21/121 |
| 2018/0316715 | A1* | 11/2018 | Liu | G06F 8/42 |
| 2018/0324213 | A1* | 11/2018 | Borlick | G06N 20/00 |

OTHER PUBLICATIONS

"DCEPT", secureworks, retrieved from the Internet, https://github.com/secureworks/dcept Sep. 22, 2016.

Mark Baggett, "Detecting Mimikatz Use On Your Network", InfoSec Handlers Diary Blog, retrieved from the Internet, https://isc.sans.edu/diary/Detecting+Mimikatz+Use+On+Your+Network/19311/ Feb. 10, 2015.

Jim Mulder, "Mimikatz Overview, Defenses and Detection", SANS Institute, retrieved from the Internet, https://www.sans.org/reading-room/whitepapers/detection/mimikatz-overview-defenses-detection-36780 Feb. 18, 2016.

* cited by examiner

SYSTEMS AND METHODS FOR DETECTING MALICIOUS NETWORK ACTIVITY

TECHNICAL FIELD

The present disclosure relates generally to computers and computer-related technology. More specifically, the present disclosure relates to systems and methods for detecting malicious network activity.

BACKGROUND

The use of electronic devices has become an everyday use in modern society. The use of electronic devices has increased as the cost of electronic devices has declined. The capabilities of electronic devices have also increased and allow people to use electronic devices in many different industries and for many different purposes. For example, electronic devices may be used to perform tasks at home, work or school. One type of an electronic device is a computer.

The technology being used in computers has been improving rapidly. Computers may range from small hand-held computing devices to desktop computer systems to large multi-processor computer systems. In some configurations, multiple computers may communicate in a network environment. Network authentication may be performed to secure network resources. For example, a calling device may provide login credentials to an authenticating device in order to access network resources.

In some instances, an attacker may attempt to perform malicious activity in a network environment. For example, an attacker may seek to compromise the authentication procedures of a network environment to access network resources. Benefits may be realized by detecting malicious network activity through network authentication.

DETAILED DESCRIPTION

A method is described. The method includes saving fake user credentials into memory of a monitored device. The method also includes monitoring for reconnaissance on the fake user credentials. The method further includes detecting a compromised account based on the fake user credential reconnaissance monitoring. The fake user credentials may include a username and a password hash for a nonexistent account.

Monitoring for reconnaissance on the fake user credentials may include hooking a directory service application protocol interface (API). A query to the directory service API may be filtered based on the fake user credentials. The query may include a lightweight directory access protocol (LDAP) query sent to the directory service API to determine information about the fake user credentials. Detecting the compromised account may include intercepting the query to the directory service API that includes the fake user credentials.

The method may also include performing forensic analysis of the compromised account in response to detecting fake user credential reconnaissance. The method may also include sending an alert in response to detecting fake user credential reconnaissance.

The method may also include deploying fake user credentials to multiple monitored devices. Each monitored device may receive unique fake user credentials. Reconnaissance on the fake user credentials may be monitored for the multiple monitored devices. The compromised account may be detected in response to detecting fake user credential reconnaissance associated with a given monitored device. Detecting the compromised monitored device may include identifying a query to a directory service API that includes fake user credentials specific to the given monitored device.

A computing device is also described. The computing device includes a processor, a memory in electronic communication with the processor and instructions stored in the memory. The instructions are executable to save fake user credentials into memory of a monitored device. The instructions are also executable to monitor for reconnaissance on the fake user credentials. The instructions are further executable to detect a compromised account based on the fake user credential reconnaissance monitoring.

A non-transitory, tangible computer-readable medium is also described. The computer-readable medium includes executable instructions for saving fake user credentials into memory of a monitored device. The computer-readable medium also includes executable instructions for monitoring for reconnaissance on the fake user credentials. The computer-readable medium further includes executable instructions for detecting a compromised account based on the fake user credential reconnaissance monitoring.

Figure 1:
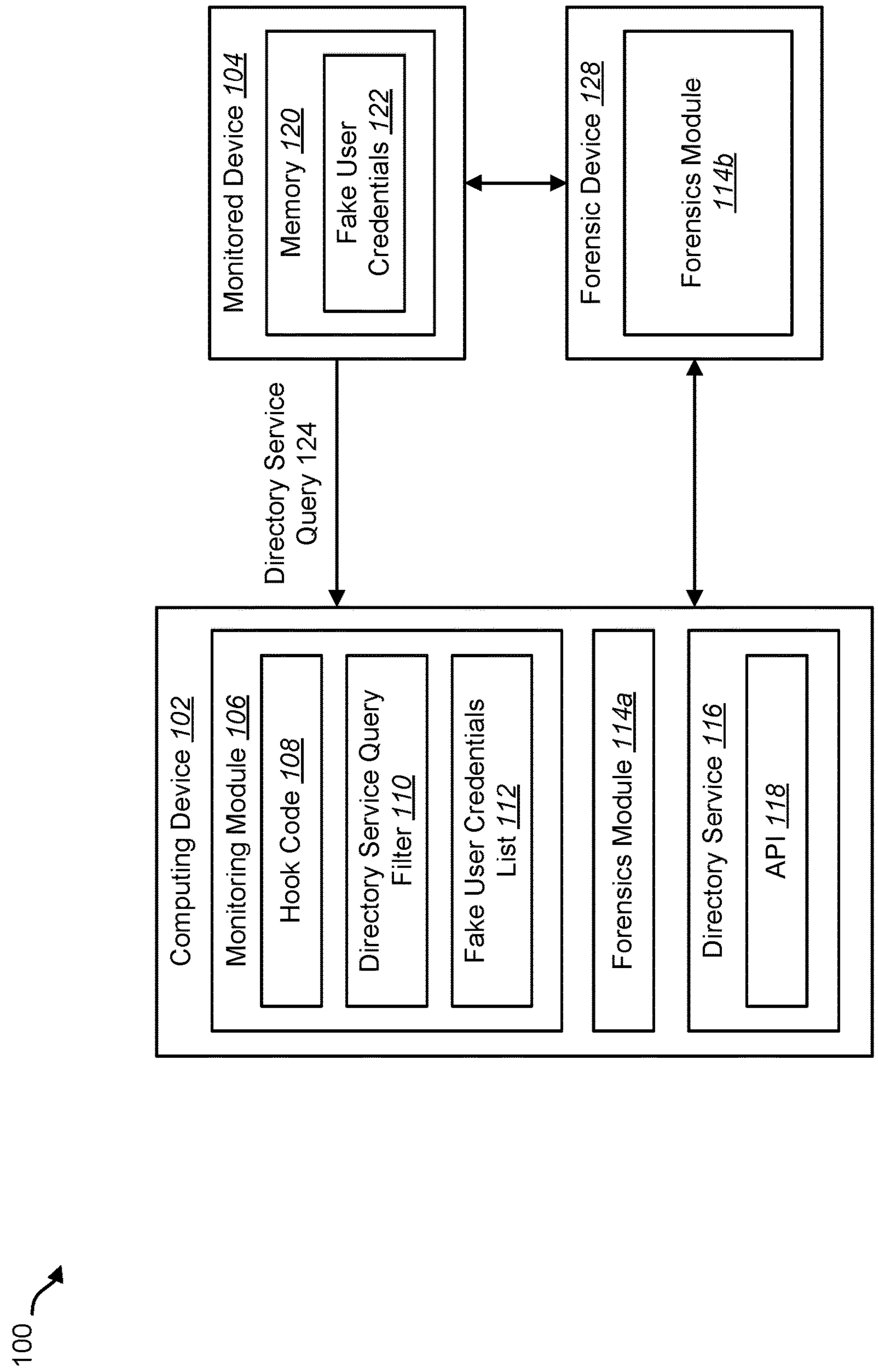
FIG. 1 is a block diagram illustrating one configuration of a network environment in which systems and methods for detecting malicious network activity may be implemented.

FIG. 1 is a block diagram illustrating one configuration of a network environment 100 in which systems and methods for detecting malicious network activity may be implemented. In particular, the systems and methods disclosed herein may allow for detecting malicious activity through network authentication processes.

A network environment 100 may include one or more computing devices 102 that are configured to monitor for malicious network activity. In some implementations the computing device 102 may be configured to communicate with other computing devices in the network environment 100. For example, the computing device 102 may communicate with one or more monitored devices 104. Examples of the computing device 102 include a desktop computer, laptop computer, workstation, tablet computer, smartphone, server, etc.

As used herein, a monitored device 104 is a computing device (e.g., desktop computer, laptop computer, workstation, tablet computer, smartphone, server, etc.) that is configured to communicate in the network environment 100. In some implementations, a user may log into an account on the monitored device 104. It should be noted that the computing device 102 and the monitored device 104 are shown as separate devices. In other implementations, the functions of the monitored device 104 may be implemented on the computing device 102. For example, a user may log into the computing device 102 and the computing device 102 may monitor for malicious network activity originating from itself.

The monitored device 104 may be configured to access network resources. For example, the monitored device 104 may be located within a local network of a computing device 102 (e.g., local area network (LAN), a wireless local area network (WLAN)) or the monitored device 104 may access the network 100 via a remote connection (e.g., remote desktop connection, Internet connection, etc.).

In some implementations, network access by a monitored device 104 may be based on user credentials. For example, when a user seeks to access the network environment 100, the user may enter user credentials into the monitored device 104. An authorization authority on the network environment 100 may authenticate network access based on the user credentials. In a MICROSOFT WINDOWS environment, authentication of a monitored device 104 may be based on a NT LAN Manager (NTLM) protocol.

When a user logs into a monitored device 104, the user enters a user name and password. The password may be converted into an encrypted password hash (e.g., a string of numbers and letters generated from the password) using a cryptographic hash function. The password hash may also be referred to as a hash. The user credentials (e.g., the user name and password hash) may be stored in the memory 120 of the monitored device 104 for later single sign-on (SSO) to network resources by the monitored device 104. In the case of a MICROSOFT WINDOWS environment, authentication and security may be performed by the local security authority subsystem service (LSASS). In this case, the memory 120 may be LSASS memory.

When the user seeks to access a network resource (e.g., file share, server, etc.) on the network environment 100, the monitored device 104 may perform an authentication procedure according to an authentication protocol (e.g., an NTLM protocol). To be authenticated on the network, the monitored device 104 may send an authentication request to the network resource. The network resource may send a challenge back to the monitored device 104. The monitored device 104 may respond to the challenge with a response that includes the encrypted password hash. It should be noted that the monitored device 104 may not send the actual password. Instead, the monitored device 104 sends the encrypted password hash in the authentication request.

The network resource may check with a directory service 116 to determine whether the username and password hash are valid. The directory service 116 may also be referred to as an authentication authority, security authority or authority. The directory service 116 may be hosted on a server. For example, the directory service 116 may be hosted on a domain controller (DC) that is configured with the directory service 116. The directory service 116 may authenticate and authorize users and computing devices in the network environment 100. The directory service 116 may also assign and enforce security policies for network users and/or computing devices. In the case of a MICROSOFT WINDOWS environment, the directory service 116 may be ACTIVE DIRECTORY.

In some examples, the directory service 116 may be hosted on the computing device 102. In other examples, the directory service 116 may be hosted on another computing device in the network environment 100 and the computing device 102 may communicate with the directory service 116 over the network.

The directory service 116 may store user credential information. For example, the directory service 116 may maintain a database of user accounts that includes user names, passwords and/or password hashes.

The directory service 116 may authenticate the credentials of the monitored device 104 that are provided by a network resource. For example, the directory service 116 may attempt to decrypt the encrypted password hash using the stored password of the user account. If the directory service 116 successfully decrypts the password hash, then the authentication request is authenticated. The directory service 116 may notify the network resource that the monitored device 104 is authenticated. The network resource may then provide access to the monitored device 104.

Network authentication is vulnerable to a number of different types of malicious activity that may compromise network security. The malicious activity may include attacks from a malicious entity, which may include third-party actors (e.g., hackers) or trusted inside actors that exploit valid user credentials to access network resources in an inappropriate manner.

This authentication procedure may be vulnerable to pass-the-hash attacks. In a pass-the-hash attack, a malicious entity (e.g., malicious user or computing process) may attempt to exploit the authentication procedure to gain access to network resources by using stored password hashes. For example, the malicious entity may compromise an account on a monitored device 104. As used herein, a compromised account is a legitimate account to which a malicious entity has gained access. This may be accomplished through phishing attacks, password cracks, or other types of attacks that allow the malicious entity to log into the monitored device 104 as a legitimate user. Additionally, an inside actor may compromise an account by exploiting valid user credentials to access network resources in an inappropriate manner.

Once the malicious entity gains access to the monitored device 104, the malicious entity may check the memory 120 for stored user credentials. For example, the malicious entity may seek the credentials of a network administrator or other user that has logged into the monitored device 104 and has high permissions on the network. The user credentials stored in the memory 120 may include the username and password hash of the other user. The malicious entity may retrieve user credentials stored in memory 120 for multiple accounts. The malicious entity may then use one or more of these user credentials to be authenticated in the network environment 100. One or more of the retrieved user credentials may have higher permissions (e.g., more privileges and access) on the network than the compromised account. Using the user credentials retrieved from memory 120, the malicious entity may gain more access on the network environment 100.

In an example of a pass-the-hash attack, a malicious entity may compromise the account of User A, who has limited privileges on the network environment 100. The malicious entity may retrieve user credentials for a network administrator that are stored in the memory 120 of the monitored device 104. The network administrator may have higher privileges on the network than User A. The malicious entity may then use the password hash and username of the network administrator to access network resources to which the network administrator has privileges.

It should be noted that in a pass-the-hash attack, after the initial account is compromised, the malicious entity may not use the actual passwords of the other accounts to compromise those accounts. Instead, the malicious entity may use the password hashes that are stored in memory 120 to perform what appears to be a genuine authentication procedure. The malicious entity may steal the stored password hashes from memory 120 and may use these password hashes to be authenticated on the network.

From a security perspective, pass-the-hash attacks are difficult to detect because they use legitimate authentication procedures to gain access to network resources. One approach to counter pass-the-hash attacks is called a pass-the-hash honeypot (also referred to as a honeyhash). With a pass-the-hash honeypot, fake user credentials 122 may be saved to memory 120. Then, if a malicious entity compromises an account, retrieves the fake user credentials 122 and attempts to use the fake user credentials 122, this indicates that an account is compromised and a pass-the-hash attack is occurring.

The fake user credentials 122 may include a username and a password hash for a nonexistent user account. In other words, the fake user credentials 122 may not be associated with any user account that is configured to access the network. Instead, the fake user credentials 122 may be for a fictitious account. In the case of a MICROSOFT WINDOWS environment, the fake user credentials 122 may include a username and NTLM password hash.

In one approach, the fake user credentials 122 may be stored into the memory 120 of the monitored device 104 by running a process in a network-only mode. For example, the command "runas/user:[FAKE USER]/netonly cmd.exe" may start a command prompt for "FAKE USER" in network-only mode. Upon entering the password for this fake user account, the password hash may be saved in memory 120. The system (e.g., WINDOWS) may not try to check the fake user credentials 122 because it is running in network-only mode. In this case, the fake user credentials 122 are only stored in the memory 120, but not included in the directory service 116. Therefore, the fake user credentials 122 are created as a lure for a malicious entity.

From the perspective of a malicious entity, the fake user credentials 122 appear to be legitimate user credentials. For example, if the malicious entity compromises an account on the monitored device 104 and accesses the memory 120 of the monitored device 104, the fake user credentials 122 may appear as legitimate user credentials. However, if the malicious entity attempted to use the fake user credentials 122, the fake user credentials 122 would not allow the malicious entity to gain access to the network resources. For example, the malicious entity could pass the fake user credentials 122, but they would fail authentication because they are not recognized by the directory service 116.

In some approaches, a pass-the-hash attack may be detected when a malicious entity attempts to use the fake user credentials 122. For example, once the malicious entity acquires the fake user credentials 122, the malicious entity may attempt to access a network resource using the fake user credentials 122. The authentication procedure would fail for these fake user credentials 122. For example, the use of the fake user credentials 122 may generate a failed authentication event 4625 in a WINDOWS environment. By monitoring for the use of the fake user credentials 122 (e.g., detecting a failed authentication event using the fake user credentials 122), a pass-the-hash attack may be detected since there is no legitimate use of the fake user credentials 122.

In another approach, malicious activity may be detected based on reconnaissance on the fake user credentials 122. Once a malicious entity acquires the fake user credentials 122, the malicious entity may attempt to acquire information about the account associated with the fake user credentials 122 before using the fake user credentials 122. For example, instead of blindly using the fake user credentials 122, the malicious entity may attempt to learn what access the fake user credentials 122 have on the network environment 100. As used herein, the term "reconnaissance" refers to activity performed to acquire information about the fake user credentials 122 and/or the account associated with the fake user credentials 122.

The malicious entity may send a directory service query 124 to the directory service 116 seeking information about the account associated with the fake user credentials 122. The directory service query 124 may seek to find out what access the account has, what groups the account is a member of, whether the account has privileges to valuable network resources, etc. By performing this reconnaissance, the malicious entity may know how to use the fake user credentials 122 in a pass-the-hash attack.

The directory service query 124 may not get natively logged by the directory service 116. This is because directory service queries 124 may happen very frequently and logging every directory service query 124 would result in too much noise.

The computing device 102 may be configured to detect reconnaissance on the fake user credentials 122. For example, the computing device 102 may include a monitoring module 106. The monitoring module 106 may maintain a fake user credentials list 112. The fake user credentials list 112 may be a record of the fake user credentials 122 and which monitored device 104 a given set of fake user credentials 122 are deployed. For example, a first set of fake user credentials 122 may be stored on a first monitored device 104 and a second set of fake user credentials 122 may be stored on a second monitored device 104, and so forth.

The monitoring module 106 may also include hook code 108 that hooks the application protocol interface (API) 118 of the directory service 116. The hook code 108 may enable the monitoring module 106 to hook (i.e., intercept) the directory service API 118. As used herein, the term hook or hooking refers to altering the behavior of the native operating system of the computing device 102 by intercepting a function call. In this case, the monitoring module 106 may use the hook code 108 to intercept the native directory service API 118 invocation by the directory service query 124.

It should be noted that the directory service query 124 may or may not be sent from the monitored device 104 from which the fake user credentials 122 were acquired. For example, a malicious entity may steal the fake user credentials 122 from the memory 120 of a monitored device 104. Then the malicious entity may send the directory service query 124 with the fake user credentials 122 from another computing device in the network environment 100.

In a MICROSOFT WINDOWS environment, the relevant directory service API 118 may be for lightweight directory access protocol (LDAP) for ACTIVE DIRECTORY. For example, the directory service query 124 may be an LDAP query of ACTIVE DIRECTORY. In other words, the directory service query 124 may be a LDAP query sent to the directory service API 118 to determine information about the fake user credentials 122. However, the directory service API 118 may be associated with other directory service protocols used for other operating systems (e.g., Unix, Linux, MacOS).

The monitoring module 106 may include a directory service query filter 110 that filters directory service queries 124 sent to the directory service API 118 based on the fake user credentials 122. For example, the directory service query filter 110 may filter all directory service queries 124 for fake user credentials 122 included in the fake user credentials list 112.

The monitoring module 106 may intercept a directory service query 124 sent to the directory service API 118 that includes the fake user credentials 122. For example, the monitoring module 106 may monitor all inbound LDAP queries attempting to look up (e.g., request information about) the account associated with the fake user credentials 122. If the monitoring module 106 intercepts a directory service query 124 that includes the fake user credentials 122, then this indicates that an account has been compromised. In other words, the presence of the fake user credentials 122 in a directory service query 124 is an indication that an account has been compromised because there is no legitimate use of the fake user credentials 122. Therefore, the monitoring module 106 may detect a compromised account by intercepting a directory service query 124 that includes the fake user credentials 122. By detecting the fake user credentials 122 in the directory service query 124, this indicates that the system is compromised and a malicious entity may be preparing to perform a pass-the-hash attack.

In an implementation, forensic analysis of the compromised account may be performed in response to detecting fake user credential reconnaissance. In one approach, the computing device 102 may include a forensics module 114*a*.

In another implementation, a separate forensic device 128 may perform the forensic analysis. In this approach, the monitoring module 106 may run on the computing device 102, which is acting as a domain controller. The forensic device 128 may include a forensics module 114*b* to perform forensic analysis. The forensic device 128 may be a server that communicates with the computing device 102 and the monitored device 104. The forensics module 114*b* may interact with the monitoring module 106 to receive information on detection of fake user credential reconnaissance. Upon receiving a notification from the monitoring module 106 that fake user credentials 122 were used or included in a directory service query 124, the forensic device 128 may be triggered to perform forensic scans of the monitored device 104.

Upon detecting the fake user credentials 122 in the directory service query 124, the forensics module 114*a* and/or forensics module 114*b* may determine information about the compromised account. The forensics module 114*a* and/or forensics module 114*b* may determine which monitored device 104 the fake user credentials 122 were stolen from. The forensics module 114*a* and/or forensics module 114*b* may determine which account was compromised to retrieve the fake user credentials 122. The forensics module 114*a* and/or forensics module 114*b* may determine when the fake user credentials 122 were stolen. The forensics module 114*a* and/or forensics module 114*b* may determine how the fake user credentials 122 were stolen (e.g., which program was used to steal the fake user credentials 122).

In some examples, the forensic analysis by the forensics module 114*a* and/or forensics module 114*b* may be accomplished by monitoring the authentication processes on the monitored device 104. For example, the forensics module 114*a* and/or forensics module 114*b* may monitor access of the LSASS processes. The forensics module 114*a* and/or forensics module 114*b* may also monitor the launch of suspicious processes (e.g. Mimikatz.exe) on the monitored device 104 that are known to be used to retrieve user credentials from memory 120.

Upon detecting fake user credential reconnaissance, the monitoring module 106 may send an alert. For example, the monitoring module 106 may send out an email or other message that indicates that a compromised account has been detected. The alert may also include additional forensic information about the compromised account (e.g., the compromised account name, the compromised monitored device 104, when the fake user credentials 122 were stolen and how the fake user credentials 122 were stolen).

In some examples, fake user credentials 122 may be monitored for multiple monitored devices 104. In this case, monitoring the multiple monitored devices 104 may include tying a given set of fake user credentials 122 to a particular monitored device 104.

In an approach described herein, fake user credentials 122 may be deployed and monitored for multiple monitored devices 104. The computing device 102 may deploy fake user credentials 122 to multiple monitored devices 104. Each monitored device 104 may receive unique fake user credentials 122. For example, a first set of fake user credentials 122 may be saved in the memory 120 of a first monitored device 104. A second set of fake user credentials 122 may be saved in the memory 120 of a second monitored device 104, and so forth. The fake user credentials 122 and which monitored device 104 they are saved on may be saved in the fake user credentials list 112. In this manner, the computing device 102 may know which fake user credentials 122 are associated with which monitored device 104. The number and location of the monitored devices 104 to deploy the fake user credentials 122 may be configurable.

In an implementation, the fake user credentials 122 may be deployed to the multiple monitored devices 104 by a script (e.g., startup script, MICROSOFT system center configuration manager (SCCM) script, remote PowerShell, etc.) that runs on the monitored devices 104. The script may run locally on a monitored device 104 and may generate a random, semi-random, or fixed username/password for the fake user credentials 122. The generated fake user credentials 122 may be logged to the event log and to the fake user credentials list 112 of the computing device 102. In some implementations, the generated account name may have the appearance of a legitimate account with high privileges (e.g., a service account, administrator account, etc.).

The monitoring module 106 may monitor for reconnaissance on the fake user credentials 122 for the multiple monitored devices 104. For example, the monitoring module 106 may intercept directory service queries 124 sent by a monitored device 104. The monitoring module 106 may filter the directory service queries 124 for fake user credentials 122.

The monitoring module 106 may detect a compromised monitored device 104 in response to detecting fake user credential reconnaissance associated with a given monitored device 104. By determining which fake user credentials 122 were included in the directory service query 124, the monitoring module 106 may identify which monitored device 104 was compromised. For example, the computing device 102 may refer to the fake user credentials list 112 to map the fake user credentials 122 included in the directory service query 124 to a certain monitored device 104.

The forensics module 114*a* and/or forensics module 114*b* may then perform additional forensics on that particular monitored device 104. For example, the forensics module 114*a* and/or forensics module 114*b* may determine the compromised account name, when the fake user credentials 122 were stolen and how the fake user credentials 122 were stolen.

It should be noted that while functions are described in terms of particular modules herein, additional or alternative modules and/or a combination of modules or a sub-part of a module may perform one or more of the functions described herein.

Figure 2:
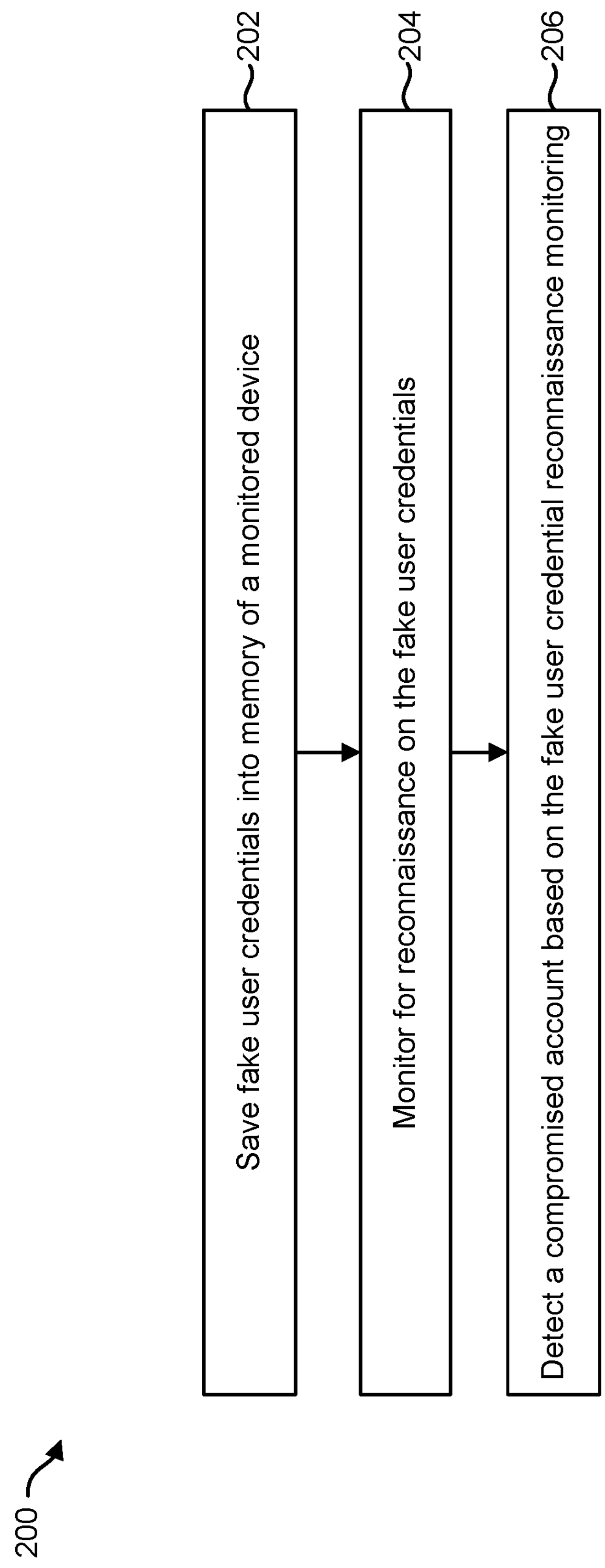
FIG. 2 is a flow diagram illustrating one configuration of a method for detecting malicious network activity.

FIG. 2 is a flow diagram illustrating one configuration of a method 200 for detecting malicious network activity. The method 200 may be implemented by a computing device 102 in a network environment 100. In an implementation, the computing device 102 may monitor communications sent to an application protocol interface (API) 118 of a directory service 116.

The computing device 102 may save 202 fake user credentials 122 into memory 120 of a monitored device 104. The fake user credentials 122 may include a username and a password hash for a nonexistent account. The fake user credentials 122 may not be associated with any user account that is configured to access the network. In the case of a MICROSOFT WINDOWS environment, the fake user credentials 122 may include a username and NTLM password hash. In an implementation, the fake user credentials 122 may be saved to the memory 120 of the monitored device 104 by causing the monitored device 104 to run a process in a network-only mode using the fake user credentials 122.

The computing device 102 may monitor 204 for reconnaissance on the fake user credentials 122. For example, the computing device 102 may hook the directory service API 118. In the case of a MICROSOFT WINDOWS environment, the computing device 102 may hook the LDAP API for ACTIVE DIRECTORY. The computing device 102 may filter a query 124 to the directory service API 118 based on the fake user credentials 122. For example, the computing device 102 may filter directory service queries 124 sent to the directory service API 118 that include the fake user credentials 122.

The computing device 102 may detect 206 a compromised account based on the fake user credential reconnaissance monitoring. For example, the computing device 102 may detect 206 a compromised account upon intercepting a directory service query 124 sent to the directory service API 118 that includes the fake user credentials 122. The computing device 102 may determine which account was used to send the directory service query 124 with the fake user credentials 122.

In some examples, the computing device 102 may perform forensic analysis of the compromised account in response to detecting fake user credential reconnaissance. For example, upon detecting the fake user credentials 122 in the directory service query 124, the computing device 102 may determine information about the compromised account. The computing device 102 may determine which monitored device 104 the fake user credentials 122 were stolen from. The computing device 102 may determine which account was compromised to retrieve the fake user credentials 122. The computing device 102 may determine when the fake user credentials 122 were stolen. The computing device 102 may determine how the fake user credentials 122 were stolen (e.g., which program was used to steal the fake user credentials 122).

Upon detecting fake user credential reconnaissance, the computing device 102 may send an alert. For example, the computing device 102 may send out an email or other message that indicates that a compromised account has been detected. The alert may also include additional forensic information about the compromised account.

Figure 3:
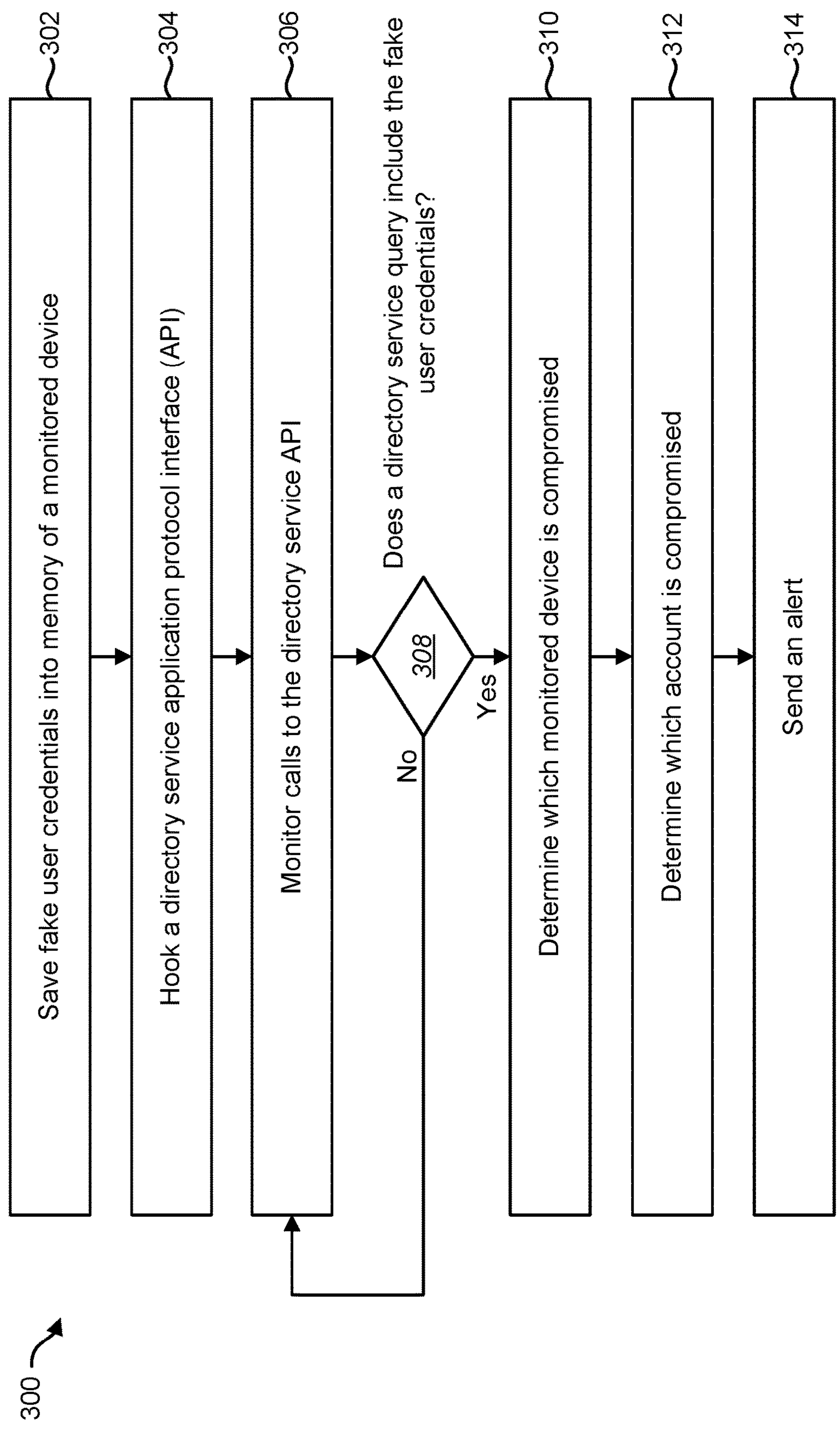
FIG. 3 is a flow diagram illustrating another configuration of a method for detecting malicious network activity.

FIG. 3 is a flow diagram illustrating another configuration of a method 300 for detecting malicious network activity. The method 300 may be implemented by a computing device 102.

The computing device 102 may save 302 fake user credentials 122 into memory 120 of a monitored device 104. For example, the computing device 102 may cause the monitored device 104 to run a process to store the fake user credentials 122 into memory 120. In an implementation, the computing device 102 may cause the monitored device 104 to run a process in a network-only mode using the fake user credentials 122, which saves the fake user credentials 122 to memory 120.

The computing device 102 may hook 304 a directory service API 118. In the case of a MICROSOFT WINDOWS environment, the computing device 102 may hook 304 the lightweight directory access protocol (LDAP) API for ACTIVE DIRECTORY.

The computing device 102 may monitor 306 calls to the directory service API 118. For example, the computing device 102 may filter directory service queries 124 sent to the directory service API 118.

The computing device 102 may determine 308 whether a directory service query 124 includes the fake user credentials 122. For example, the directory service query 124 may include the fake user credentials 122 (e.g., username and password hash) as a string. The computing device 102 may read the directory service queries 124 to determine whether the fake user credentials 122 are present. If the fake user credentials 122 are not included in the directory service query 124, then the computing device 102 may continue to monitor 306 calls to the directory service API 118.

If the computing device 102 determines 308 that a directory service query 124 includes the fake user credentials 122, then the computing device 102 may determine 310 which monitored device 104 is compromised. For example, the computing device 102 may determine 310 which monitored device 104 sent the directory service query 124.

The computing device 102 may determine 312 which account is compromised. For example, the computing device 102 may determine 312 which account (e.g., user account) on the monitored device 104 was used to send the directory service query 124.

The computing device 102 may send 314 an alert. For example, the monitoring module 106 may send 314 out an email or other message that indicates that a compromised account has been detected. The alert may also include information about the compromised account, the compromised monitored device 104 and/or additional forensic information about the compromised account.

Figure 4:
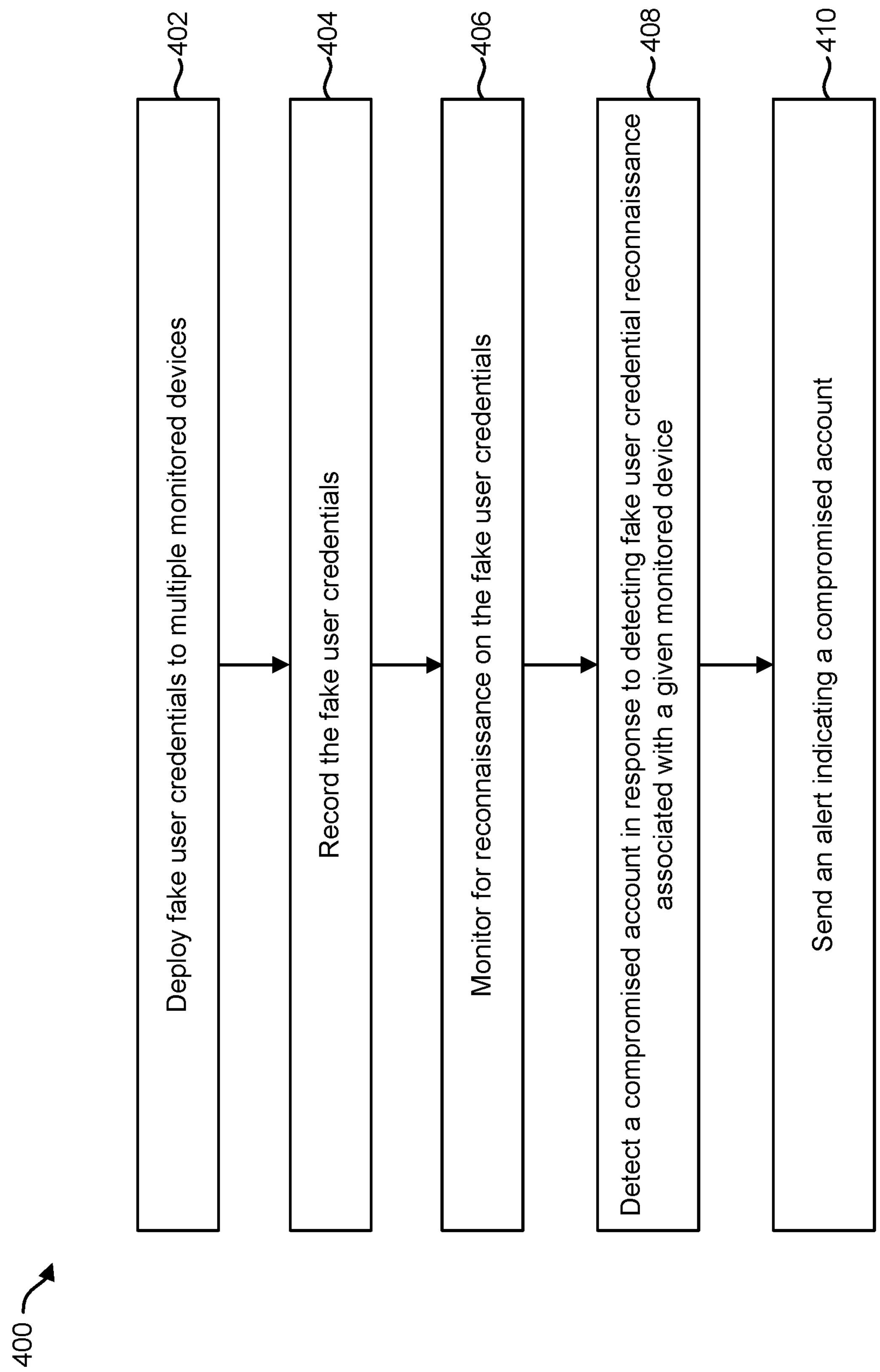
FIG. 4 is a flow diagram illustrating yet another configuration of a method for detecting malicious network activity.

FIG. 4 is a flow diagram illustrating yet another configuration of a method 400 for detecting malicious network activity. The method 400 may be implemented by a computing device 102.

The computing device 102 may deploy 402 fake user credentials 122 to multiple monitored devices 104. Each monitored device 104 may receive one or more unique fake user credentials 122. For example, a first set of fake user credentials 122 may be saved in the memory 120 of a first monitored device 104. A second set of fake user credentials 122 may be saved in the memory 120 of a second monitored device 104, and so forth.

In an implementation, the fake user credentials 122 may be deployed to the multiple monitored devices 104 by a script (e.g., startup scripts, SCCM, remote PowerShell, etc.) that runs on the monitored devices 104. For example, the computing device 102 may send the script to the multiple monitored devices 104. Once received, the script may run locally on a monitored device 104. The script may cause the monitored device 104 to generate a random, semi-random, or fixed username/password for the fake user credentials 122. Once generated, each of the monitored devices 104 may save the generated fake user credentials 122 to memory 120.

In another implementation, the fake user credentials 122 for the multiple monitored devices 104 may be generated by the computing device 102. For example, the computing device 102 may generate a first set of fake user credentials 122 for a first monitored device 104. The computing device 102 may generate a second set of fake user credentials 122 for a second monitored device 104, and so forth. Once generated, the computing device 102 may send the fake user credentials 122 to the multiple monitored devices 104.

The computing device 102 may record 404 the generated fake user credentials 122. For example, the generated fake user credentials 122 may be saved to a fake user credentials list 112 that is maintained by the computing device 102. The fake user credentials list 112 may map the generated fake user credentials 122 to certain monitored devices 104. Therefore, the computing device 102 may know which fake user credentials 122 correspond to which monitored device 104.

In the implementation where the monitored device 104 generates the fake user credentials 122, the monitored device 104 may log each of the fake user credentials 122 that it generates to the event log of the monitored device 104. The monitored device 104 may report the generated fake user credentials 122 to the computing device 102, which stores the generated fake user credentials 122 to the fake user credentials list 112.

The computing device 102 may monitor 406 for reconnaissance on the fake user credentials 122. For example, the computing device 102 may intercept directory service queries 124 sent by a monitored device 104. The computing device 102 may filter the directory service queries 124 for fake user credentials 122.

The computing device 102 may detect 408 a compromised account in response to detecting fake user credential reconnaissance associated with a given monitored device 104. For example, upon determining that a directory service query 124 includes fake user credentials 122, then this occurrence indicates a compromised account. The computing device 102 may identify which monitored device 104 was compromised. For example, the computing device 102 may check the fake user credentials list 112 to determine which monitored device 104 had the fake user credentials 122 that were included in the directory service query 124.

In some examples, the computing device 102 may perform additional forensics on the compromised account and/or compromised monitored device 104. For example, the computing device 102 may determine the compromised account name, when the fake user credentials 122 were stolen and how the fake user credentials 122 were stolen.

The computing device 102 may send 410 an alert indicating a compromised account. For example, the computing device 102 may send 410 an email or other message that indicates that a compromised account has been detected. The alert may include information about which account was compromised, which monitored device 104 was compromised and/or additional forensic information about the compromised account.

Figure 5:
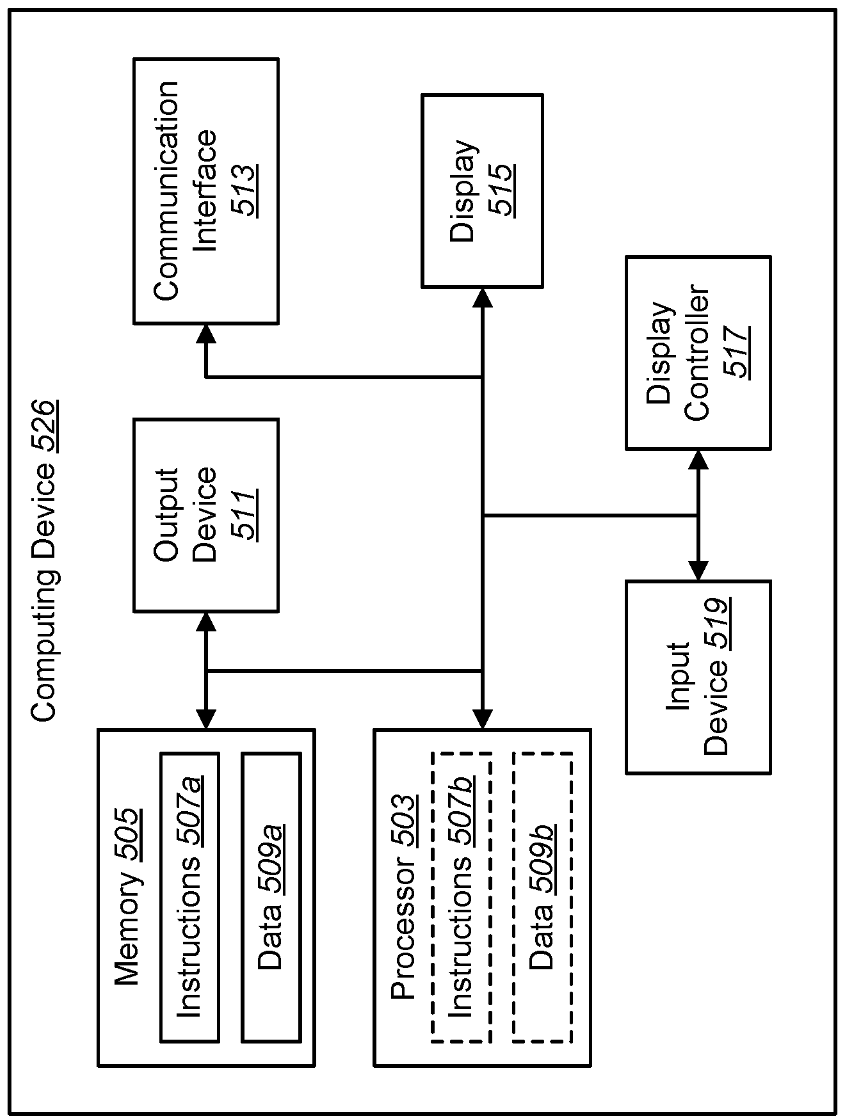
FIG. 5 is a block diagram illustrating components that may be utilized by a computing device.

FIG. 5 is a block diagram illustrating components that may be utilized by a computing device 526. The computing device 526 may be configured in accordance with one or more of the computing devices 102 or the monitored devices 104 described herein.

The computing device 526 may communicate with other electronic devices through one or more communication interfaces 513. Communication through the communication interface 513 may be achieved through different methods such as wired communication, wireless communication or both wired and wireless communication. For example, the communication interface 513 may be a serial port, a parallel port, a Universal Serial Bus (USB), an Ethernet adapter, an IEEE bus interface, a small computer system interface (SCSI) bus interface, an infrared (IR) communication port, a Bluetooth wireless communication adapter and so forth.

The computing device 526 may receive and transmit information through one or more input devices 519 and one or more output devices 511. The input devices 519 may be a keyboard, mouse, microphone, remote control device, button, joystick, trackball, touchpad, lightpen, etc. The output devices 511 may be a speaker, printer, etc. A display device 515 is an output device that may be included in a computer system. Display devices 515 may project information through different technologies, such as liquid crystal display (LCD), light-emitting diode (LED), gas plasma, electroluminescence, a cathode ray tube (CRT) or the like.

A processor 503 controls the operation of the computing device 526 and may be a microprocessor, a microcontroller, a digital signal processor (DSP) or other device known in the art. A memory 505 may be included in the computing device 526 and includes instructions **507*a* and data 509*a* to assist the processor 503 in operating the computing device 526. The memory 505 may send program instructions 507*b* and/or data 509*b* to the processor 503 in order for the processor 503 to perform logical and arithmetic operations according to methods disclosed herein. The processor 503 may execute one or more of the instructions stored in the memory 505** to implement one or more of the systems and methods disclosed herein.

Data **509*a* stored in the memory 505 may be converted to text, graphics and/or moving images (as appropriate) by a display controller 517. Of course, FIG. 5 illustrates only one possible configuration of a computing device 526**. Various other architectures and components may be utilized.

In an implementation, the computing device 526 may be a headless server. For example, the computing device 526 may be configured to provide services to other computing devices with or without peripheral input/output interfaces.

In another implementation, the computing device 526 may be configured to run on desktop and server hardware, both physical and virtual. In yet another implementation, the computing device 526 may be configured to run desktop and server operating systems (e.g., MICROSOFT WINDOWS).

In this application, various terms have been connected to reference numbers. The reference numbers are for an element in the one or more Figures. If a term is not connected to a reference number, the term is meant more generally and without limitation to any particular Figure.

In this application, the term "determining" has been used. The term "determining" is meant to cover several different actions and, therefore, some examples of "determining" are computing, calculating, processing, investigating, looking up (e.g., looking up in a table, a database or another data structure), ascertaining and the like. The term "determining" also covers resolving, selecting, choosing, establishing and the like. The term "determining" can also cover receiving information or accessing information.

In this application, the term "based on" means more than "based only on," except where expressly stated. The term "based on" describes both "based only on" and "based at least on."

In this application, the term "processor" is meant to be broadly interpreted and covers a general purpose processor, a central processing unit (CPU), a microprocessor, a digital signal processor (DSP), a controller, a microcontroller, a state machine, and so forth. Under some circumstances, a "processor" may refer to an application specific integrated circuit (ASIC), a programmable logic device (PLD), a field programmable gate array (FPGA), etc. The term "processor" may also be a combination of several processing devices, e.g., a combination of a DSP and a microprocessor, a plurality of microprocessors, one or more microprocessors in conjunction with a DSP core, or any other such configuration.

In this application, the term "memory" is meant to be broadly interpreted and covers electronic storage devices capable of storing information electronically. The term "memory" covers various types of memory technology such as programmable read-only memory (PROM), random access memory (RAM), read-only memory (ROM); erasable programmable read only memory (EPROM), non-volatile random access memory (NVRAM), electrically erasable PROM (EEPROM), flash memory, magnetic or optical data storage, registers, etc. A processor and memory are in electronic communication, where the processor can read or write information located within the memory. Memory that is integral to a processor is in electronic communication with the processor.

In this application, the terms "instructions" and "code" are meant to be broadly interpreted and cover code or statements that are computer-readable. For example, the terms "instructions" and "code" may cover programs, routines, sub-routines, functions, procedures, etc. of assembly language code or intermediate language code.

In this application, the term "computer-readable medium" covers any available medium that a computer or processor can access. For example, a computer-readable medium may comprise optical disk storage such as RAM, ROM, EEPROM, CD-ROM, any magnetic disk storage devices, or any other medium for carrying or storing instructions and code that can be accessed by a computer or processor. A computer-readable medium may be non-transitory and tangible. The terms "disk" and "disc" cover compact disc (CD), laser disc, optical disc, digital versatile disc (DVD), floppy disk and Blu-ray® disc disks typically are used for data magnetically accessible, and discs typically are used for data optically accessible through lasers.

As used herein, the term "and/or" should be interpreted to mean one or more items. For example, the phrase "A, B and/or C" should be interpreted to mean any of: only A, only B, only C, A and B (but not C), B and C (but not A), A and C (but not B), or all of A, B, and C. As used herein, the phrase "at least one of" should be interpreted to mean one or more items. For example, the phrase "at least one of A, B and C" or the phrase "at least one of A, B or C" should be interpreted to mean any of: only A, only B, only C, A and B (but not C), B and C (but not A), A and C (but not B), or all of A, B, and C. As used herein, the phrase "one or more of" should be interpreted to mean one or more items. For example, the phrase "one or more of A, B and C" or the phrase "one or more of A, B or C" should be interpreted to mean any of: only A, only B, only C, A and B (but not C), B and C (but not A), A and C (but not B), or all of A, B, and C.

Instructions and code may be transmitted over a transmission medium. Instructions and code may also be called software. For example, software may be transmitted from a website, server, or other remote source. The transmission medium may be a coaxial cable, fiber optic cable, twisted pair, digital subscriber line (DSL), or wireless technologies such as infrared, radio, and microwave.

In this application, the methods comprise steps or actions for achieving the functions and processes described above. The method steps are to be understood as interchangeable with one another. The interchanging of a step is not to be understood as departing from the scope of the claims. In this application, the order of steps and actions may be modified and not depart from the scope of the claims, unless a specific order is stated for the steps or actions being described.

The claims are to be understood to not be limited to the exact configuration and components discussed above. The claims are to be understood to cover any reasonable modifications, changes and variations of the arrangement, operation and details of the systems, methods, and apparatus described herein.

What is claimed is:

1. A method, comprising:

deploying fake user credentials to memories of multiple monitored devices, wherein each monitored device receives unique fake user credentials;

monitoring for reconnaissance from a malicious entity on the fake user credentials for the multiple monitored devices, wherein the monitoring for the reconnaissance comprises hooking a directory service application protocol interface (API) and filtering a lightweight directory access protocol (LDAP) query to the directory service API based on the fake user credentials, wherein hook code alters native operating system behavior to intercept a function call;

detecting a compromised account based on the fake user credential reconnaissance monitoring; and sending an alert in response to detecting fake user credential reconnaissance.

2. The method of claim 1, wherein the fake user credentials comprise a username and a password hash for a nonexistent account.

3. The method of claim 1, wherein the query is sent from the malicious entity to determine information about the fake user credentials.

4. The method of claim 1, wherein detecting the compromised account comprises:

intercepting the LDAP query to the directory service API that includes at least one of the fake user credentials.

5. The method of claim 1, further comprising performing forensic analysis of the compromised account in response to detecting fake user credential reconnaissance.

6. The method of claim 1, further comprising:

detecting the compromised account in response to detecting fake user credential reconnaissance associated with a given monitored device.

7. The method of claim 6, wherein detecting the compromised monitored device comprises identifying a query to a directory service API that includes fake user credentials specific to the given monitored device.

8. A computing device, comprising:

a processor;

a memory in electronic communication with the processor;

instructions stored in the memory, the instructions being executable to:

deploy fake user credentials to memories of multiple monitored devices, wherein each monitored device receives unique fake user credentials;

monitor for reconnaissance from a malicious entity on the fake user credentials for the multiple monitored devices, wherein the instructions executable to monitor for reconnaissance comprise instructions executable to hook a directory service application protocol interface (API) and filter a lightweight directory access protocol (LDAP) query to the directory service API based on the fake user credentials, and wherein the instructions executable to hook the directory service API comprise a hook code to alter native operating system behavior to intercept a function call;

detect a compromised account based on the fake user credential reconnaissance monitoring; and send an alert in response to detecting fake user credential reconnaissance.

9. The computing device of claim 8, wherein the fake user credentials comprise a username and a password hash for a nonexistent account.

10. The computing device of claim 8, wherein the instructions executable to detect the compromised account comprise instructions executable to:

determine that the LDAP query includes at least one of the fake user credentials.

11. The computing device of claim 8, further comprising instructions executable to:

detect the compromised account in response to detecting fake user credential reconnaissance associated with a given monitored device.

12. A non-transitory, tangible computer-readable medium, comprising executable instructions for:

deploying fake user credentials to memories of multiple monitored devices, wherein each monitored device receives unique fake user credentials;

monitoring for reconnaissance from a malicious entity on the fake user credentials for the multiple monitored devices, wherein the executable instructions for monitoring for the reconnaissance comprise executable instructions for hooking a directory service application protocol interface (API) and filtering a lightweight directory access protocol (LDAP) query to the directory service API based on the fake user credentials, and wherein the executable instructions for hooking comprise a hook code for altering native operating system behavior to intercept a function call;

detecting a compromised account based on the fake user credential reconnaissance monitoring; and sending an alert in response to detecting fake user credential reconnaissance.

13. The computer-readable medium of claim 12, wherein the fake user credentials comprise a username and a password hash for a nonexistent account.

14. The computer-readable medium of claim 12, wherein the executable instructions for detecting the compromised account comprise executable instructions for:

intercepting the LDAP query to the directory service API that includes at least one of the fake user credentials.

15. The computer-readable medium of claim 12, further comprising executable instructions for:

detecting the compromised account in response to detecting fake user credential reconnaissance associated with a given monitored device.

* * * * *